US010502182B2

(12) United States Patent
Elayyan

(10) Patent No.: US 10,502,182 B2
(45) Date of Patent: Dec. 10, 2019

(54) WIND TURBINE

(71) Applicant: Moa'z Mahmoud Yusuf Elayyan, Amman (JO)

(72) Inventor: Moa'z Mahmoud Yusuf Elayyan, Amman (JO)

(*) Notice: Subject to any disclaimer, the term of this patent is extended or adjusted under 35 U.S.C. 154(b) by 581 days.

(21) Appl. No.: 15/230,618

(22) Filed: Aug. 8, 2016

(65) Prior Publication Data

US 2018/0038344 A1 Feb. 8, 2018

(51) Int. Cl.
| | | |
|---|---|---|
| F03D 3/04 | (2006.01) | |
| F03D 3/00 | (2006.01) | |
| F03D 7/06 | (2006.01) | |
| F03D 3/06 | (2006.01) | |
| F03D 9/25 | (2016.01) | |

(52) U.S. Cl.
CPC ........... *F03D 3/0481* (2013.01); *F03D 3/005* (2013.01); *F03D 3/062* (2013.01); *F03D 7/06* (2013.01); *F03D 9/25* (2016.05); *Y02E 10/74* (2013.01)

(58) Field of Classification Search
CPC ........ F03D 3/0481; F03D 3/005; F03D 3/062; F03D 7/06; F03D 9/25; F05B 2260/90; F05B 2260/92; Y02E 10/74
See application file for complete search history.

(56) References Cited

U.S. PATENT DOCUMENTS

| | | | | |
|---|---|---|---|---|
| 2,067,542 A | * | 1/1937 | Penton | F03D 3/065 416/179 |
| 4,004,861 A | * | 1/1977 | Soules | F03D 3/067 416/119 |
| 4,082,479 A | * | 4/1978 | Rangi | F03D 7/06 416/169 R |
| 4,776,762 A | * | 10/1988 | Blowers, Sr. | F03D 3/068 416/119 |
| 7,132,760 B2 | * | 11/2006 | Becker | F03D 3/002 290/55 |
| 8,362,636 B2 | * | 1/2013 | Ling | F03D 3/005 290/55 |
| 8,829,704 B2 | * | 9/2014 | Grigg | F03D 3/002 290/54 |
| 2007/0177970 A1 | * | 8/2007 | Yokoi | F03D 3/005 415/4.2 |
| 2010/0021300 A1 | * | 1/2010 | Noguchi | F03D 3/062 416/37 |

* cited by examiner

*Primary Examiner* — Justin D Seabe
*Assistant Examiner* — Adam W Brown
(74) *Attorney, Agent, or Firm* — Matheson Keys & Kordzik PLLC; Kelly Kordzik

(57) ABSTRACT

A wind turbine including a plurality of substantially similar vertically extending blades with a semi-circular profile, wherein each of such blades is divided into two adjacent compartments; an upper plate; a lower plate; and an electric generator with a gear box. The wind turbine may also include a braking mechanism to control the rotational speed of the blades such that the produced electrical parameters are below the rated characteristics of the electric generator.

5 Claims, 8 Drawing Sheets

WIND TURBINE

TECHNICAL FIELD

The present disclosure relates to devices and systems for converting renewable energy into electricity, and more particularly to wind turbines that have braking mechanisms.

BACKGROUND

Usually, fossil fuel is used to generate electricity, but the limited availability of such source of energy to generate electricity has moved the world's focus on other renewable energy sources for electrical energy generation.

Among previous wind turbines, there is provided a wind turbine disclosed in the PCT patent application no. WO2004018872, and the PCT patent application no. WO2009029509.

The prior art turbines have not improved and enhanced the performance of the conventional wind turbines. Thus, the present disclosure provides a vertical axis wind turbine that has an engineered design with improved performance relative to the conventional wind turbines.

BRIEF DESCRIPTION OF THE DRAWINGS

Embodiments of the present invention will now be described with reference to the accompanying drawings, which illustrate embodiments of the present disclosure without restricting the scope and the spirit of the invention thereof, and in which.

DETAILED DESCRIPTION

Figure 1:
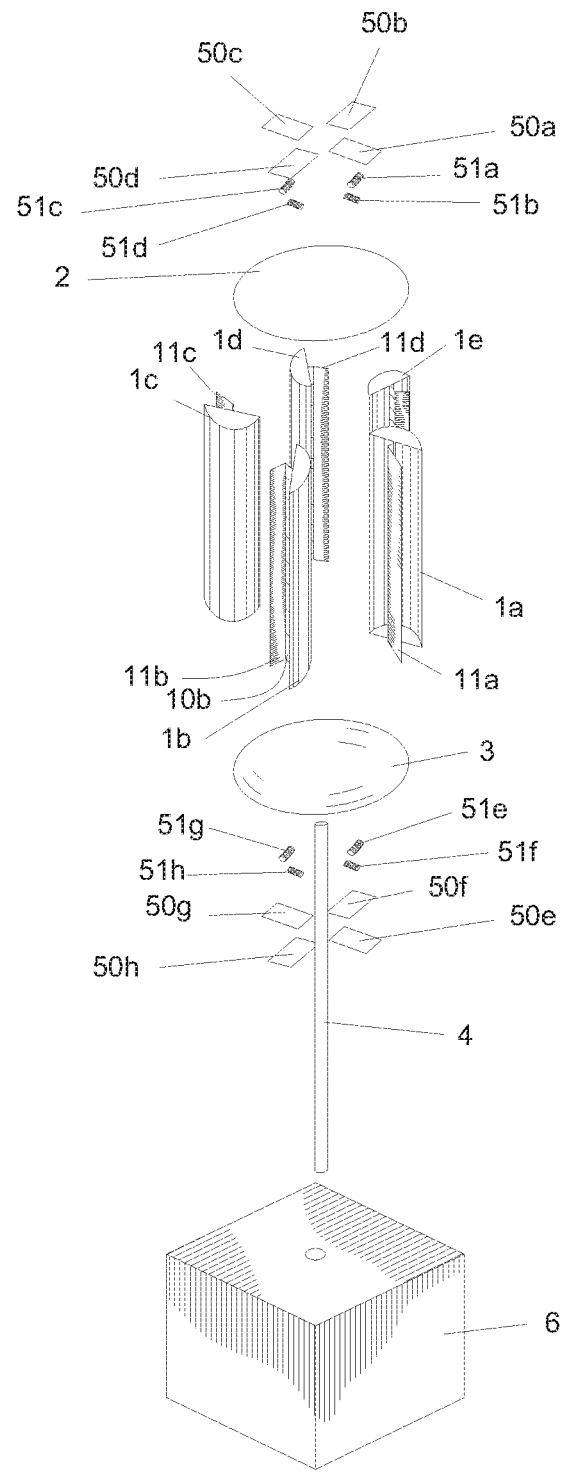
FIG. 1 illustrates an exploded view of a wind turbine configured according to embodiments of the present disclosure.
Figure 2:
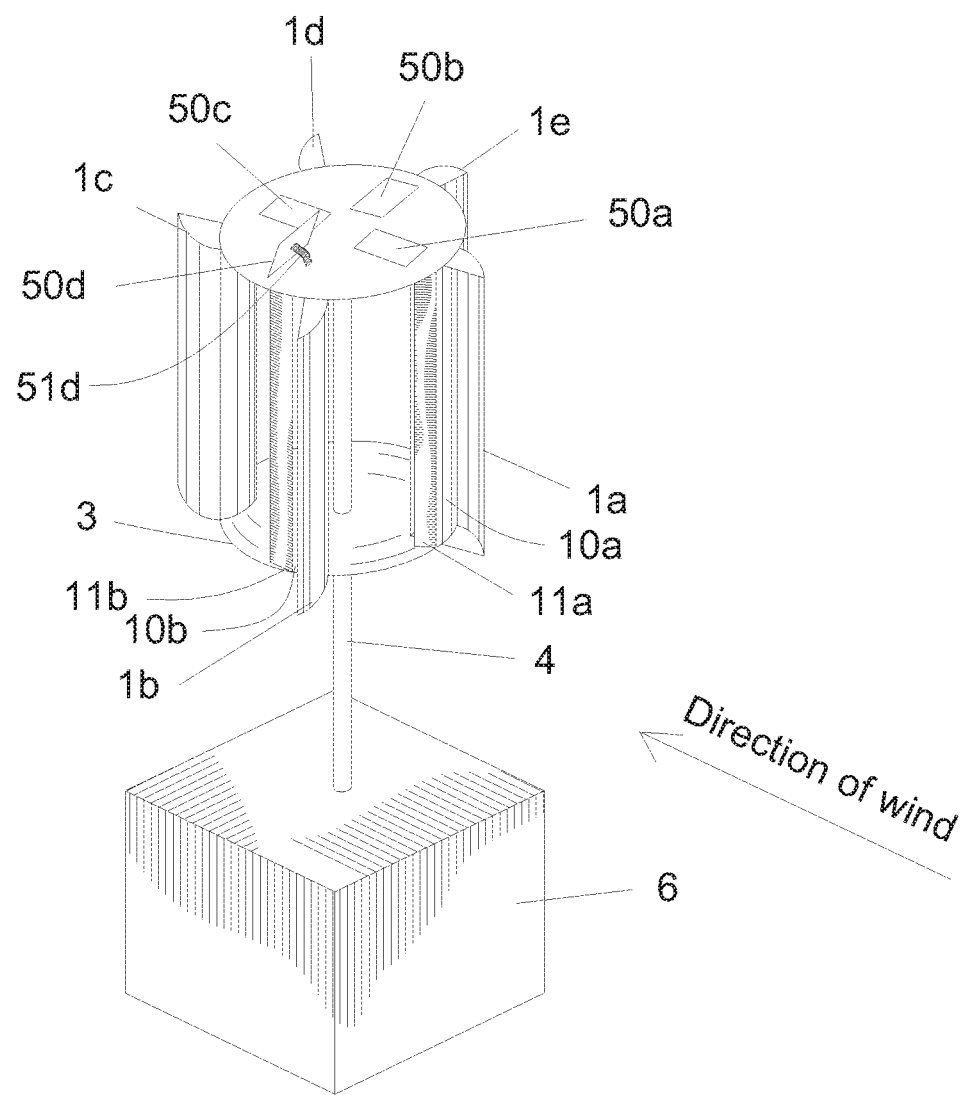
FIG. 2 illustrates a perspective view of the wind turbine with some open braking plates, wherein such wind turbine is configured according to embodiments of the present disclosure.
Figure 3:
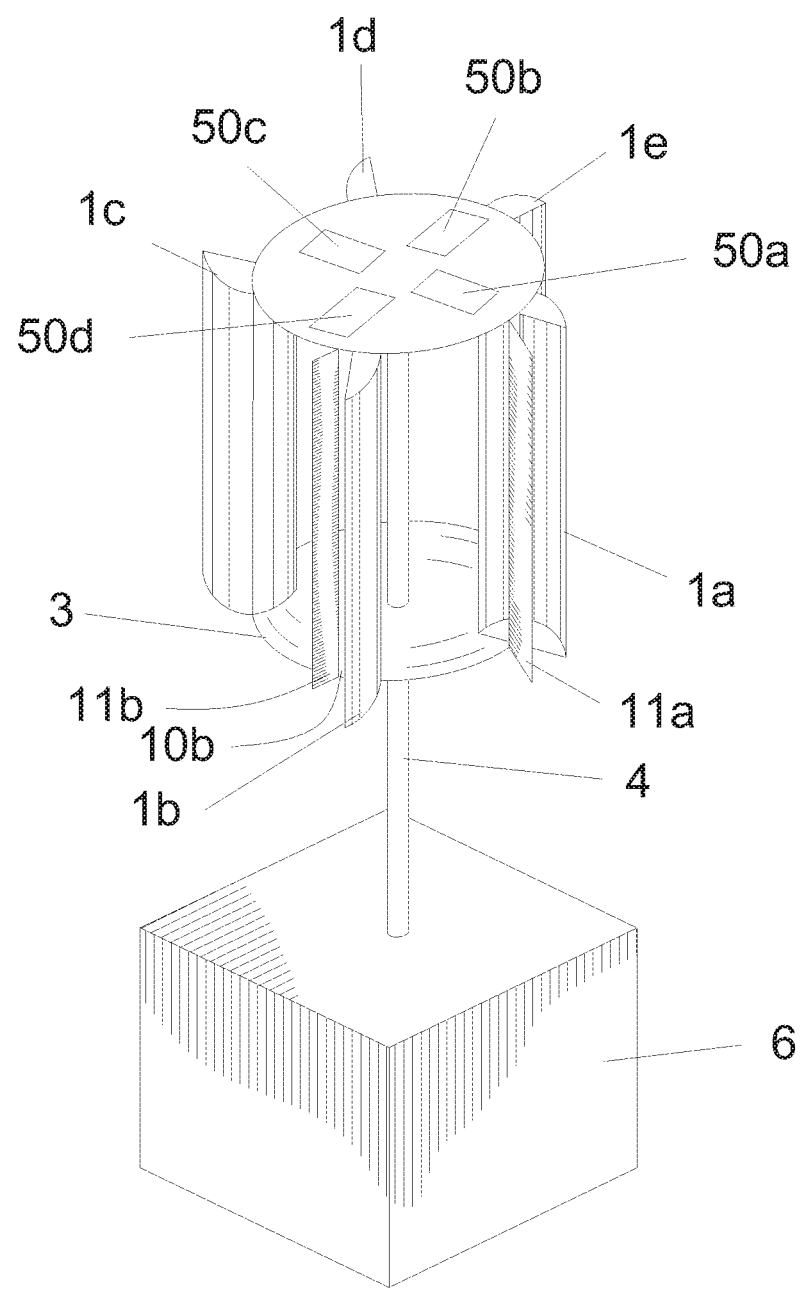
FIG. 3 illustrates a perspective view of the wind turbine with all braking plates closed, wherein such wind turbine is configured according to embodiments of the present disclosure.
Figure 4A:
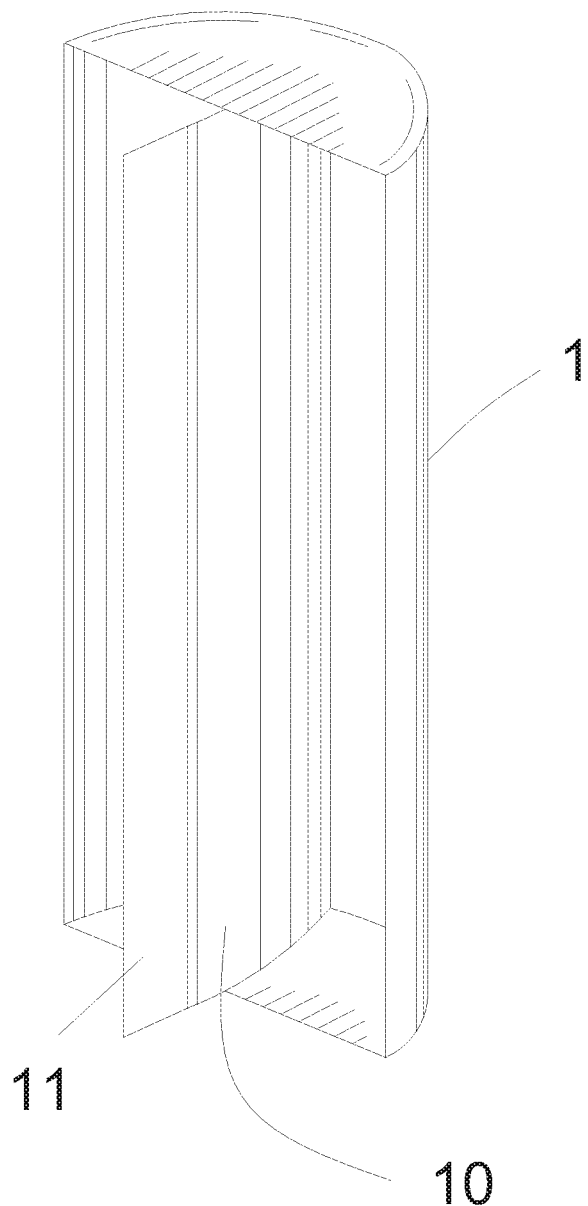
FIG. 4A illustrates a perspective view of a blade of the wind turbine configured according to embodiments of the present disclosure.
Figure 4B:
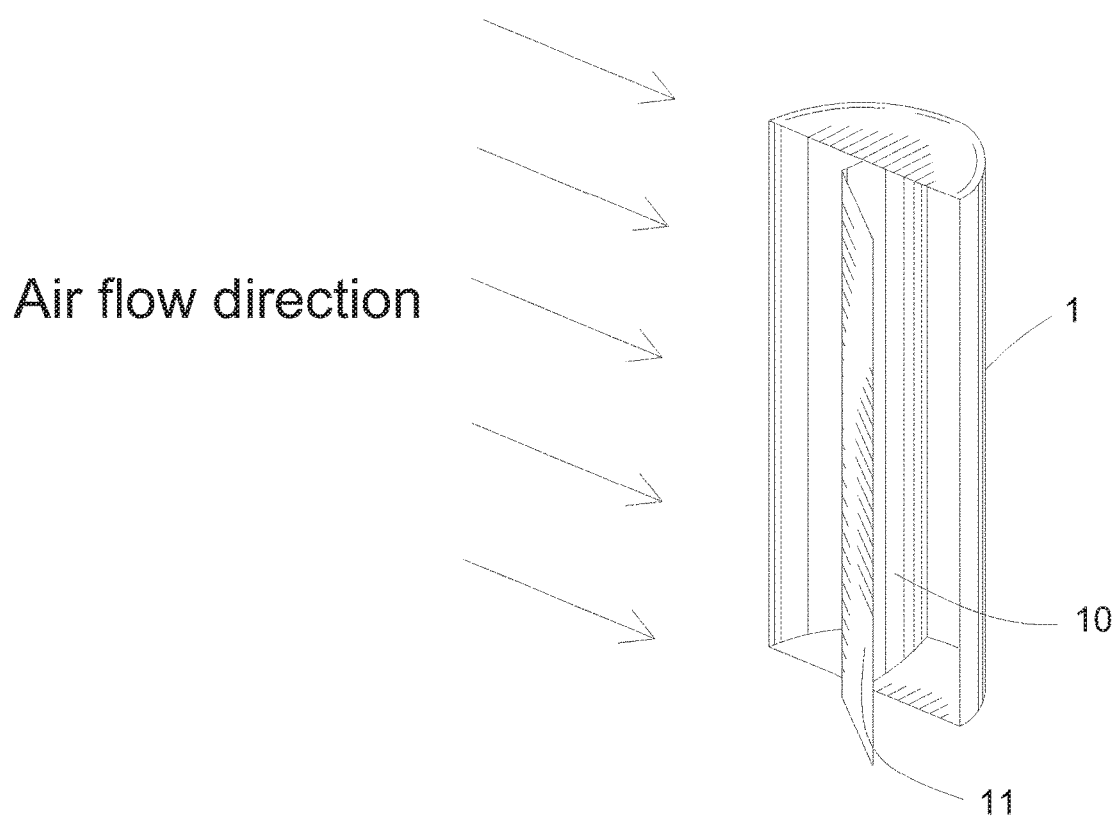
FIGS. 4B-4C illustrate perspective views of the blade of the wind turbine with some different directions of a flapping member according to different air flow directions, wherein such wind turbine is configured according to embodiments of the present disclosure.
Figure 4C:
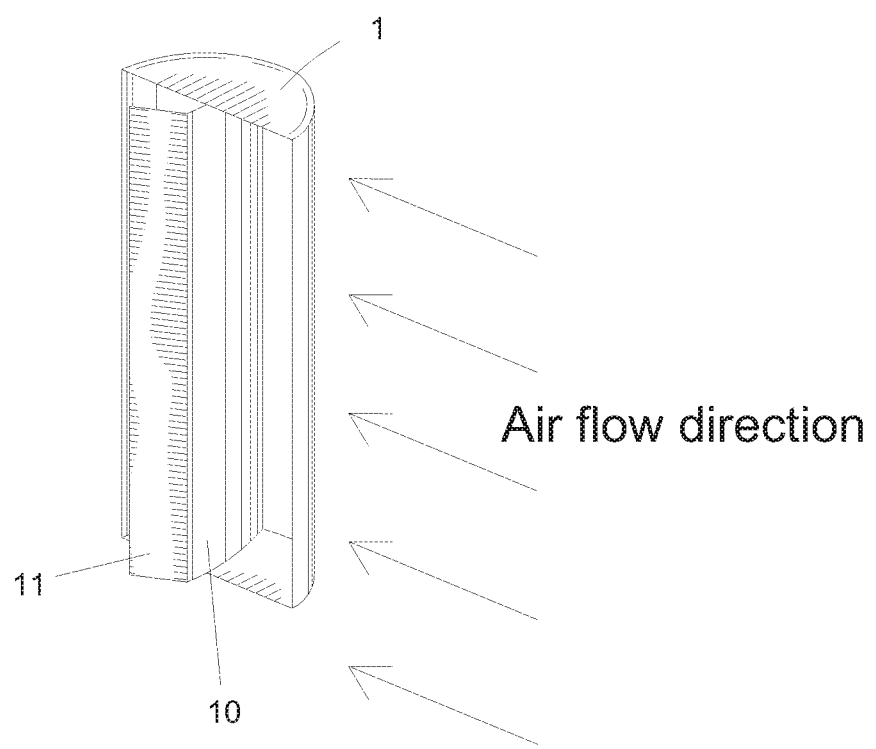

FIGS. 1, 2, 3, and 4 illustrate a wind turbine with blades configured according to embodiments of the present disclosure. Such embodiments includes two or more curved blades 1 (in the exemplary embodiments illustrated in FIGS. 1-3, there are illustrated five curved blades labeled as 1a, 1b, 1c, 1d, and 1e) each having a substantially semi-circular cross-sectional profile, wherein each of such blades 1a, 1b, 1c, 1 d, and 1e is divided into two adjacent compartments (each having a substantially quarter-circular cross-sectional profile) by means of a partition 10 rigidly attached to an inside of each of the blades 1 (i.e., 10a, 10b, 10c, 10d, and 10e, respectively). In exemplary embodiments of the present disclosure illustrated in FIGS. 1-3, the partitions 10 are illustrated as curved partitions; however, note that the partitions 10 may be of any shape (i.e. may be straight or curved), wherein the dimensions of such partitions may allow to form the compartments in the blades. Each of the partitions 10 has a hinged flapping member 11 (i.e., 11a, 11b, 11c, 11d, and 11e), wherein each of the hinged flapping members 11a-11e is free to rotate about the line of hinged contact with its respective partition 10a-10e at an angle of about 90°, wherein each of the flapping members 11 is rotated towards the shaft 4 at an angle of about 45° measured with respect to the perimeters of the upper and lower plates 2 and 3. Embodiments of the present disclosure also include an upper plate 2; a lower plate 3, wherein such plates 2, 3 trap each of the curved blades 1a-1e longitudinally between them; and a shaft 4 connected to a well-known gearbox and well-known electric generator 6 (details not shown), wherein such shaft 4 is rigidly attached to the upper and lower plates 2, 3. Embodiments further include a braking mechanism, wherein such braking mechanism contains two or more braking plates 50 (in the exemplary embodiments illustrated in FIGS. 1-3, there are illustrated eight braking plates distributed evenly on the upper and lower plates 2 and 3 (i.e., 50a, 50b, 50c, 50d, 50e, 50f, 50g, 50h) (assuming there are provided four braking plates on each of the circular plates 2, 3), each with a corresponding spring 51 (i.e., 51a, 51b, 51c, 51d, 51e, 51f, 51g, 51h). Note that the number and dimensions of the braking plates 50 and the characteristics of the springs may be determined according to the size of the turbine and its surrounding environment.

In embodiments of the present disclosure, each of the curved partitions 10a-10e is tangent to the respective circumferences of the upper and lower plates 2, 3, such that only one of the adjacent compartments formed in the blades 1 is in physical contact with the upper and lower plates 2, 3, and the other adjacent compartment is positioned outside of the perimeters of the upper and lower plates 2, 3.

In embodiments of the present disclosure, the rotation of each of the flapping members 11 is caused by the flow of air within the environment surrounding the turbine, which forces movement of the flapping members 11a-11e towards the inside of the turbine at an angle of about 45°, which causes a change in the direction of the driving force resulting from the air flow movement to become oriented in the same direction of the wind turbine. Thus, an additional driving force for the wind turbine is formed due to the presence of such flapping members 11.

In embodiments of the present disclosure, the length of each of the curved partitions 10a-10e is greater than the radius of each semi-circular blade 1a-1e, and is curved to be tangent to the upper and lower plates' perimeters, which functions to redirect the received air flow and collect a large amount of such air flow inside the external compartment.

The upper and lower plates 2, 3 may be rigidly connected to the blades 1a-1e using any suitable connecting means.

In embodiments of the present disclosure, each of the upper and lower plates 2, 3 is attached to the shaft 4 at substantially its center of gravity such that the shaft 4 forms a fulcrum for the wind turbine. The shaft 4 may pass through a hole in the top of the container enclosing the gearbox and electrical generator 6.

In embodiments of the present disclosure, the number of blades may be any number N, where N≥2, the upper and lower plates 2, 3 may be circular, and the shapes of each of the braking plates 50a-50h may be rectangular, or any other suitable shape and dimension.

In embodiments of the present disclosure, the blades 1a-1e, plates 2 and 3, partitions 10a-10e, flapping members 11a-11e, and braking plates 50a-50h may be made of aluminum, plastic, or any other rigid material, which may be light in weight and resistant to environmental factors.

The dimensions of the blades 1a-1e, plates 2 and 3, partitions 10, flapping members 11a-11e, braking plates 50a-50h, shaft 4, as well as the characteristics of the springs 51a-51h depend on the scale of the wind turbine of embodiments of the present disclosure, and the rated operating parameters of the electric generator used.

In embodiments of the present disclosure, the blades 1a-1e, plates 2 and 3, and the shaft 4 of the wind turbine rotate in the same direction as the received flow of air (e.g., wind), wherein when air flows towards the blades 1a-1e, it will accordingly collide with the partitions 10a-10e in a manner so that the air is trapped in the compartment that is uncovered by the plates 2 and 3. Accordingly, entrapped air speed will be reduced, while the air flowing on the outer surfaces of the semi-circular blades 1 and entering towards the shaft 4 (i.e., the un-trapped air) will retain its speed. The difference in pressure between the trapped and un-trapped air creates an aerodynamic force that drives the turbine in the embodiments of the present disclosure.

In the wind turbine of embodiments of the present disclosure, when the air flowing on the outer surfaces of the semi-circular blades enters towards the inside of the wind turbine (towards the shaft 4), it is temporarily retained in the area formed between the upper and lower plates 2, 3. The only exit channels for such retained air are arched spaces between the blades, wherein when such air flow exits the turbine through these arched spaces between the blades 1a-1e.

In the wind turbine of embodiments of the present disclosure, when air flows towards the flapping members 11a-11e, the air flow driving force pushes such flapping members 11a-11e to move inwardly toward the shaft 4 at an angle of about 45° between such flapping members and the upper and lower plates' perimeters, which will result in a change of the driving force to become oriented in the same direction of the blades' rotation. At the opposite side, when air flow exits at the openings between the blades, such exiting air pushes the flapping members at an angle of about 45° with respect to the hinged line of contact towards the outside of the turbine. This causes a change in the direction of air flow driving force to become in the same direction of the blades' rotation, thus, and additional aerodynamic driving force is being applied to the wind turbine of embodiments of the present disclosure.

Figure 5A:
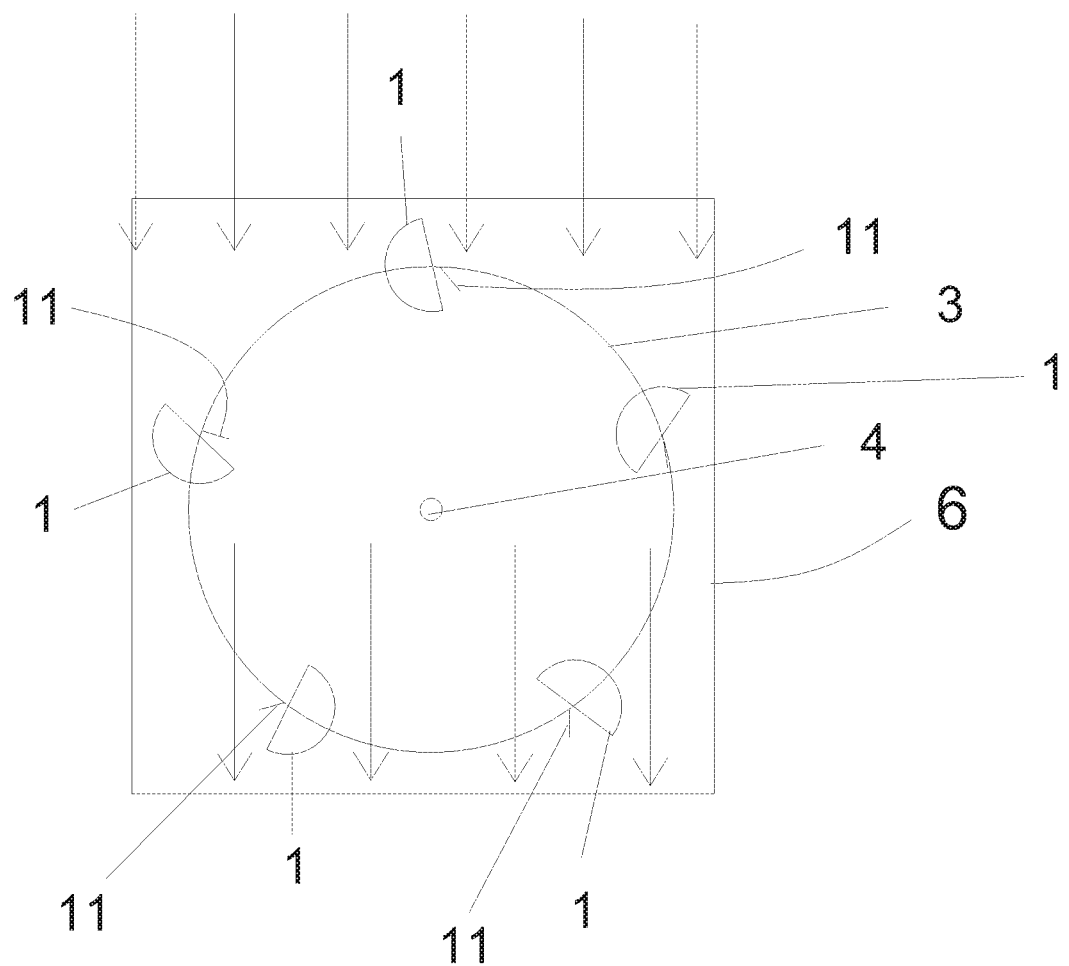
FIGS. 5A-5B illustrate top cut-away views of the wind turbine with some different directions of a flapping member according to different air flow directions, wherein such wind turbine is configured according to embodiments of the present disclosure.
Figure 5B:
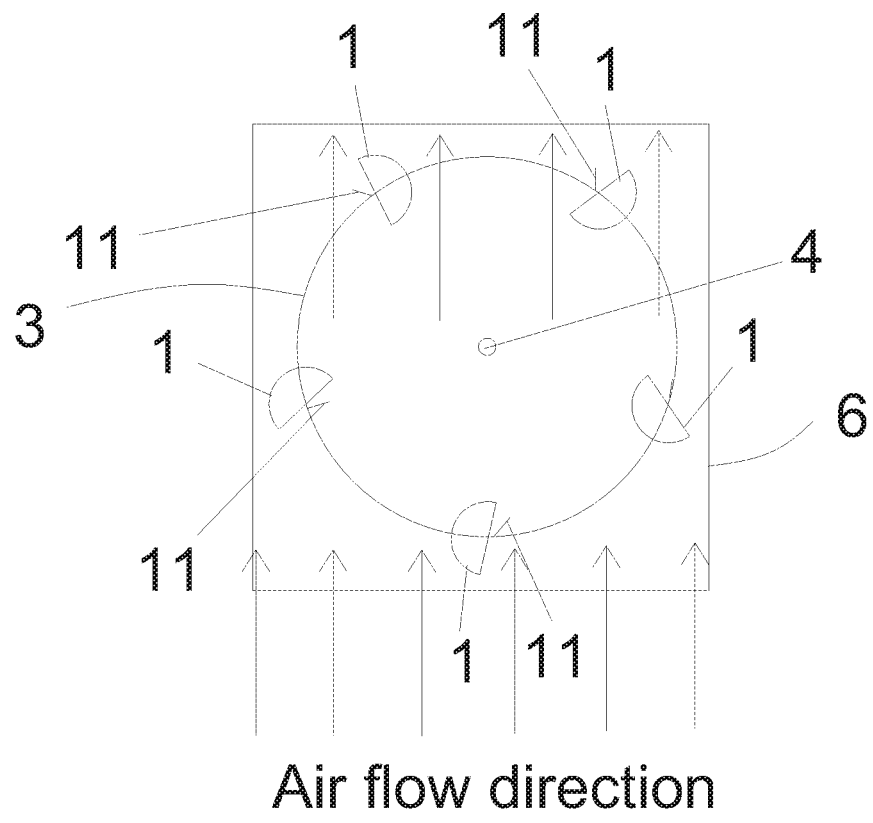

In embodiments of the present invention, the braking plates 51 are configured such that they alternate between an open position and a closed position. In the exemplary embodiments illustrated in FIGS. 1-5, the open position is defined when the braking plates 51 form an angle with the upper and lower plates 2 and 3 and the closed position is defined when the braking plates 51 are parallel to the upper and lower plates 2 and 3. The braking plates 51 are connected to the upper and lower plates 2 and 3 through the springs 52, wherein such springs ensure that the braking plates 51 are in the closed position when there is no air flow or when a speed of the air flow is lower than a threshold pre-determined speed, wherein such a pre-determined speed can be pre-set according to the maximum rated specification of the electric generator 6. When the air flow speed becomes higher than the threshold pre-determined speed, at least one of the braking plates that faces the wind direction transitions between its closed position to an open position, wherein the springs 52 are configured to prevent the braking plates from opening in a range of angles greater than a desired range. The open position of the braking plates 51 allows them to form a resistive force to the air flow, thus maintaining the turbine rotating in allowable ranges of speed that depends on the rated specification of the electric generator 6.

In embodiments of the present disclosure, the gear box and electric generator 6 may include a suitable gearbox and electric generator known in the art.

Embodiments of the wind turbine of the present disclosure are illustrated and described herein with its axis (i.e., the orientation of the shaft 4) positioned in a substantially vertical manner, with the gearbox and electric generator 6 positioned beneath the wind turbine. However, embodiments of the wind turbine may be implemented in any orientation, including horizontally, and with the gearbox and electric generator positioned anywhere in relation to the wind turbine. Moreover, the plates 2, 3 may have any suitable shapes.

While embodiments of the present disclosure have been described in detail and with reference to specific embodiments thereof, it will apparent to one skilled in the art that various additions, omissions, and modifications can be made without departing from the spirit and scope thereof.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or."

The invention claimed is:

1. A wind turbine comprising:
a first plate;
a second plate;
two or more substantially semi-circular blades coupled to said first and second plates;
a shaft coupled to said first and second plates;

an electric generator with a gearbox coupled to said shaft;

a plurality of partitions, each of said partitions corresponds to one of said substantially semi-circular blades and is tangential to respective circumferences of the first and second plates, wherein each of said partitions has a hinged flapping member, wherein each of said partitions divides each of said substantially semi-circular blades longitudinally into two adjacent compartments such that only one of the adjacent compartments is in physical contact with the first and second plates, and wherein each of said hinged flapping members is hinged at a longitudinal edge of each of said partitions, and wherein each said hinged flapping member is configured to rotate towards and away from said shaft within a confined range of angles; and a braking mechanism coupled to said first plate and said second plate containing a plurality of braking plates and springs, the plurality of braking plates being configured to angularly alternate between an open position and a closed position.

2. The wind turbine as in claim 1, wherein said braking plates are fixed from an edge at an outer surface of said first plate and said second plate by hinges and springs.

3. The wind turbine as in claim 2, wherein said springs are configured to prevent the opening of said braking plates when wind and rotational speeds of the substantially semi-circular blades are within an allowed limit.

4. The wind turbine as in claim 2, wherein said braking plates are configured to open automatically when a rotational speed of the substantially semi-circular blades reaches a maximum allowed speed limit.

5. The wind turbine as in claim 2, wherein said springs are configured to restore and maintain a default closed position of said braking plates when wind and rotational speeds of said wind turbine are below a maximum allowed limit.

* * * * *